United States Patent
Schwartz et al.

(10) Patent No.: US 6,661,879 B1
(45) Date of Patent: Dec. 9, 2003

(54) SYSTEM AND METHOD FOR RECORDING TELEPHONIC COMMUNICATIONS

(75) Inventors: William I. Schwartz, New York, NY (US); Robert M. Charland, New York, NY (US)

(73) Assignee: Xtend Communications Corp., New York, NY (US)

( * ) Notice: Subject to any disclaimer, the term of this patent is extended or adjusted under 35 U.S.C. 154(b) by 144 days.

(21) Appl. No.: 09/711,280

(22) Filed: Nov. 10, 2000

Related U.S. Application Data

(63) Continuation-in-part of application No. 09/619,515, filed on Jul. 19, 2000.

(51) Int. Cl.[7] .............................................. H04M 3/42
(52) U.S. Cl. .............................. 379/88.25; 379/100.05; 379/93.25; 379/68
(58) Field of Search ......................... 379/74, 85, 93.21, 379/100.05, 67.1; 455/412, 413, 414.1, 882.3, 88.23, 88.25

(56) References Cited

U.S. PATENT DOCUMENTS

| | | | |
|---|---|---|---|
| 3,851,121 A | | 11/1974 | Marvin |
| 4,833,704 A | | 5/1989 | Hashimoto |
| 4,843,498 A | | 6/1989 | Graf von Zedlitz und Trützschler |
| 5,249,217 A | | 9/1993 | Lee |
| 5,544,231 A | * | 8/1996 | Cho .......................... 379/88.24 |
| 5,559,875 A | | 9/1996 | Bieselin et al. |
| 5,568,538 A | | 10/1996 | Tamir et al. |
| 5,590,171 A | | 12/1996 | Howe et al. |
| 5,740,543 A | | 4/1998 | Maeda |
| 5,995,824 A | * | 11/1999 | Whitfield .................. 455/412.1 |
| 6,058,180 A | | 5/2000 | Young |
| 6,072,860 A | * | 6/2000 | Kek et al. .................. 379/88.25 |
| 6,222,909 B1 | * | 4/2001 | Qua et al. .................. 379/88.22 |
| 6,363,264 B1 | * | 3/2002 | Overy et al. ................. 455/566 |
| 6,404,859 B1 | * | 6/2002 | Hasan ....................... 379/88.04 |
| 6,449,496 B1 | * | 9/2002 | Beith et al. .................. 455/563 |
| 6,529,602 B1 | * | 3/2003 | Walker et al. .............. 380/283 |
| 6,549,614 B1 | * | 4/2003 | Zebryk et al. ................. 379/75 |

FOREIGN PATENT DOCUMENTS

| | | | |
|---|---|---|---|
| DE | 198 20 162 A1 | 11/1999 | |
| EP | 0 561 180 A2 | 9/1993 | |
| EP | 0 736 993 A1 | 10/1996 | |
| EP | 1 059 797 A2 | 12/2000 | |
| EP | 1 199 870 A1 | 4/2002 | |
| WO | WO 98/39901 | * 9/1998 | ............ H04M/3/42 |
| WO | WO 02/07420 A2 | 1/2002 | |

OTHER PUBLICATIONS

International Search Report dated Jan. 17, 2003.

* cited by examiner

Primary Examiner—Allan Hoosain
Assistant Examiner—Olisa Anwah
(74) Attorney, Agent, or Firm—Scott D. Wofsy; Edwards & Angell, LLP

(57) ABSTRACT

A system and method are disclosed for recording a wireless telephone call upon demand comprising the steps of initiating a telephone call from a telephone device with at least one receiving party, and establishing a third-party connection with a central archive to facilitate recordation of the content of the telephone call by the central archive by performing at least one of the steps of depressing a dedicated function key on the telephone device, selecting an appropriate option from a menu displayed on the telephone device, entering a code on the telephone device represented by a sequence of keystrokes, and uttering a recognized voice command.

19 Claims, 7 Drawing Sheets

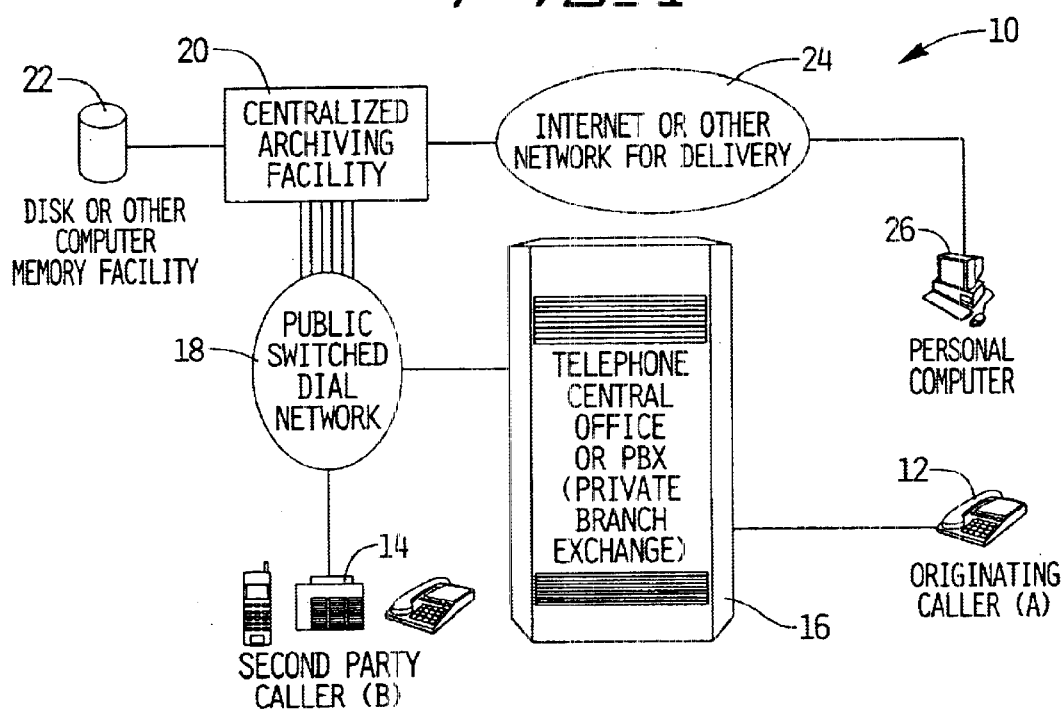
FIG_1
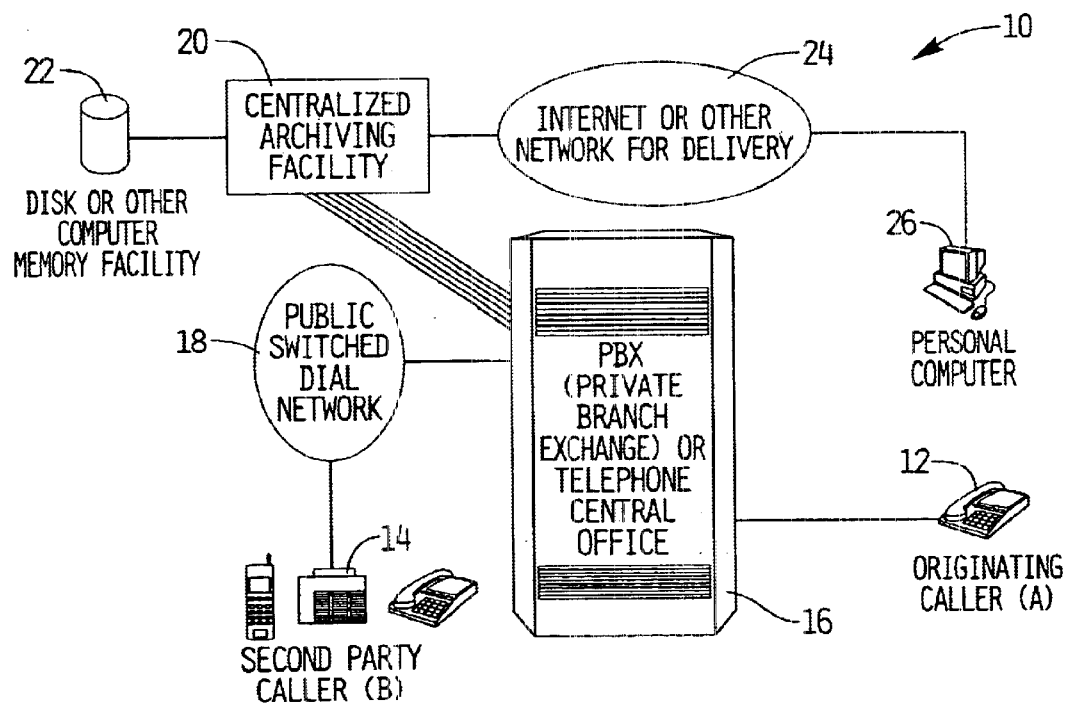
FIG_2

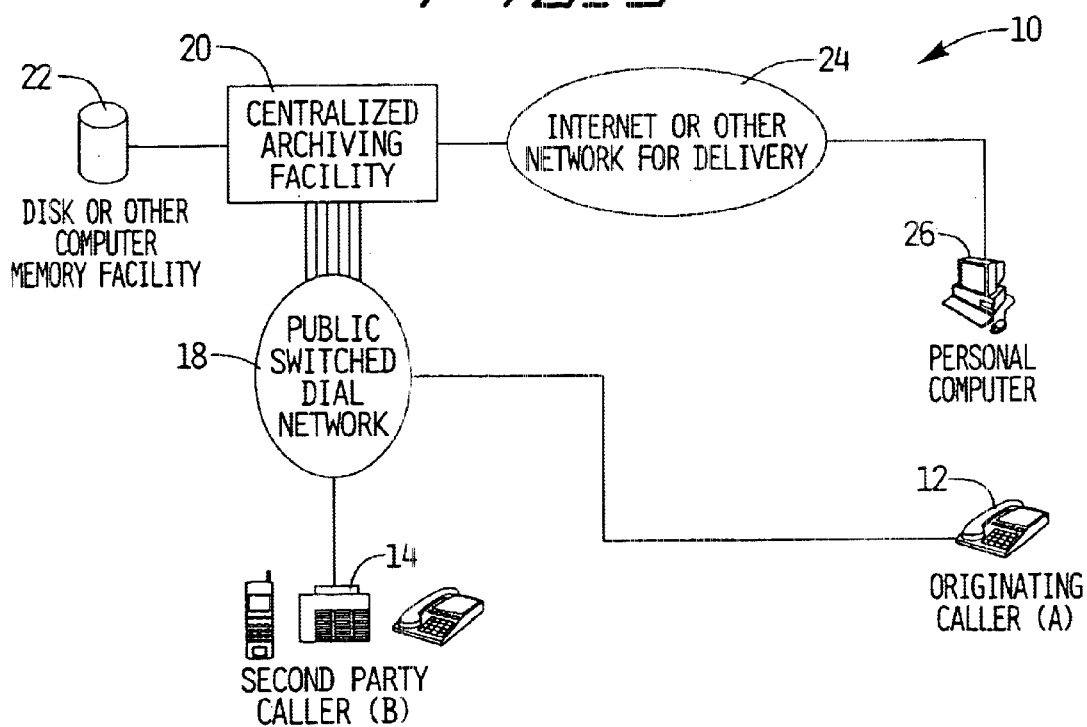
FIG_3
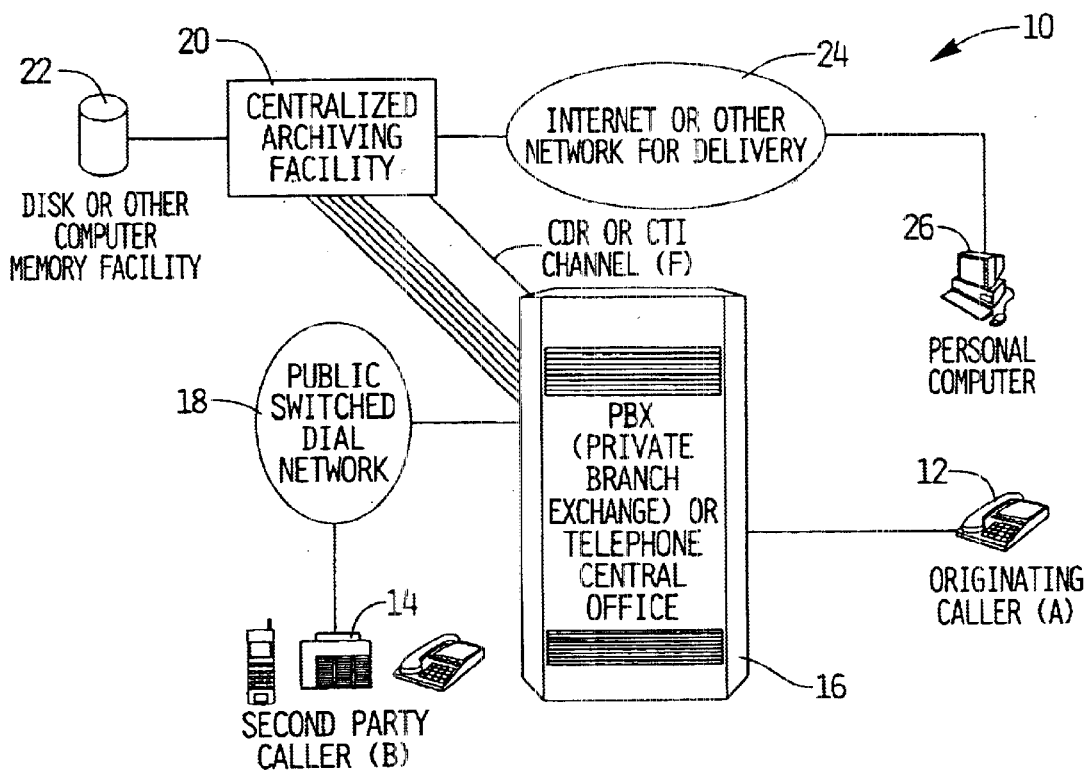
FIG_4

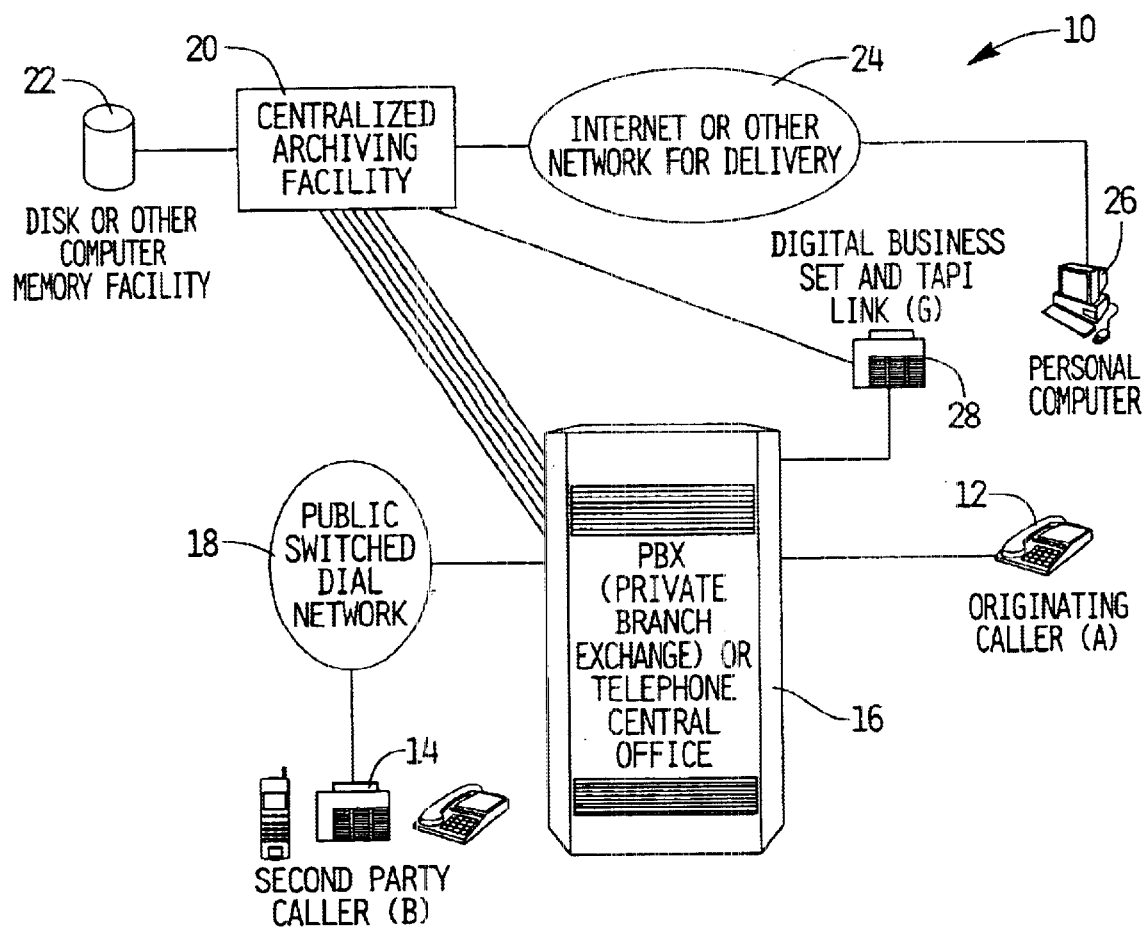

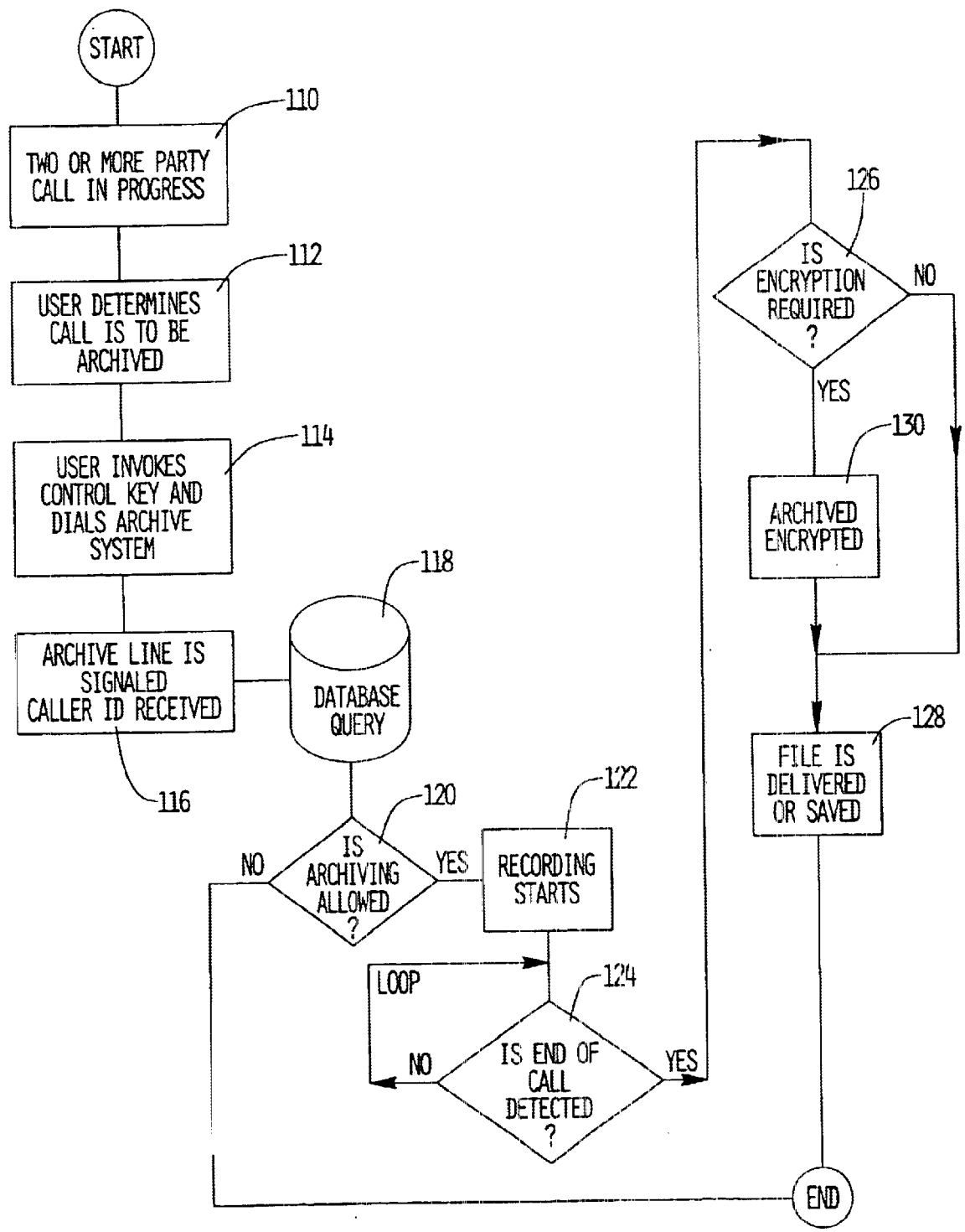
FIG_6

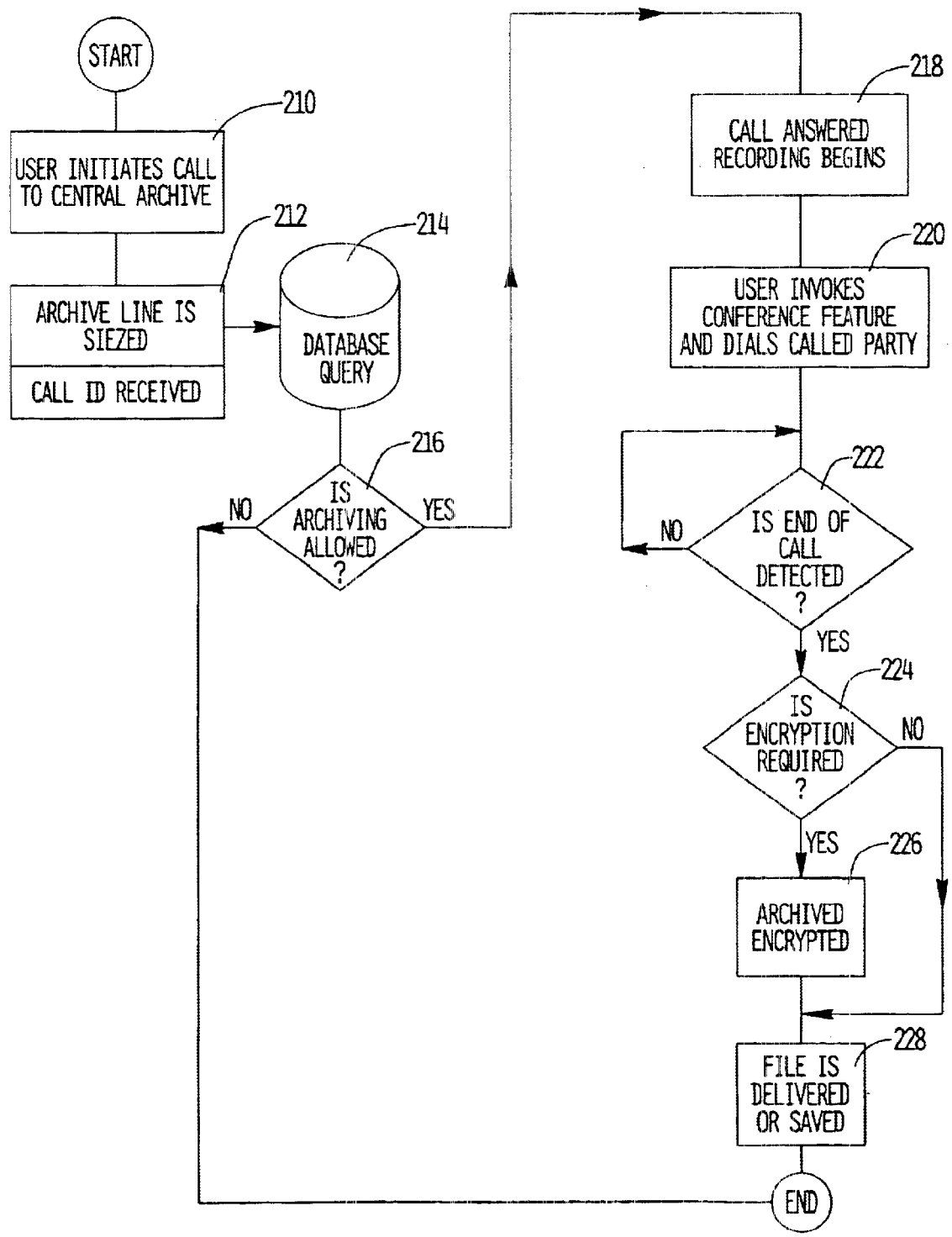

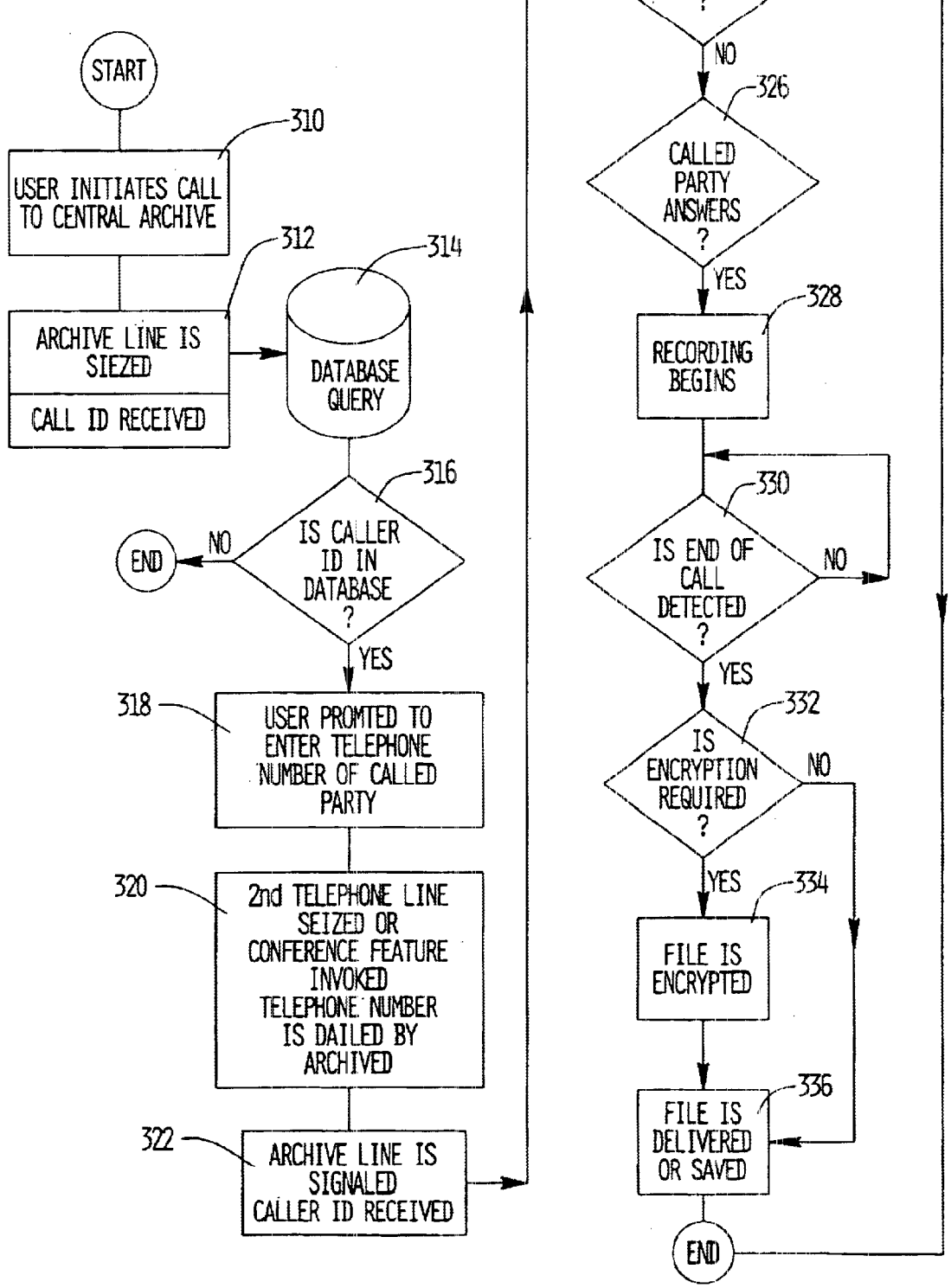

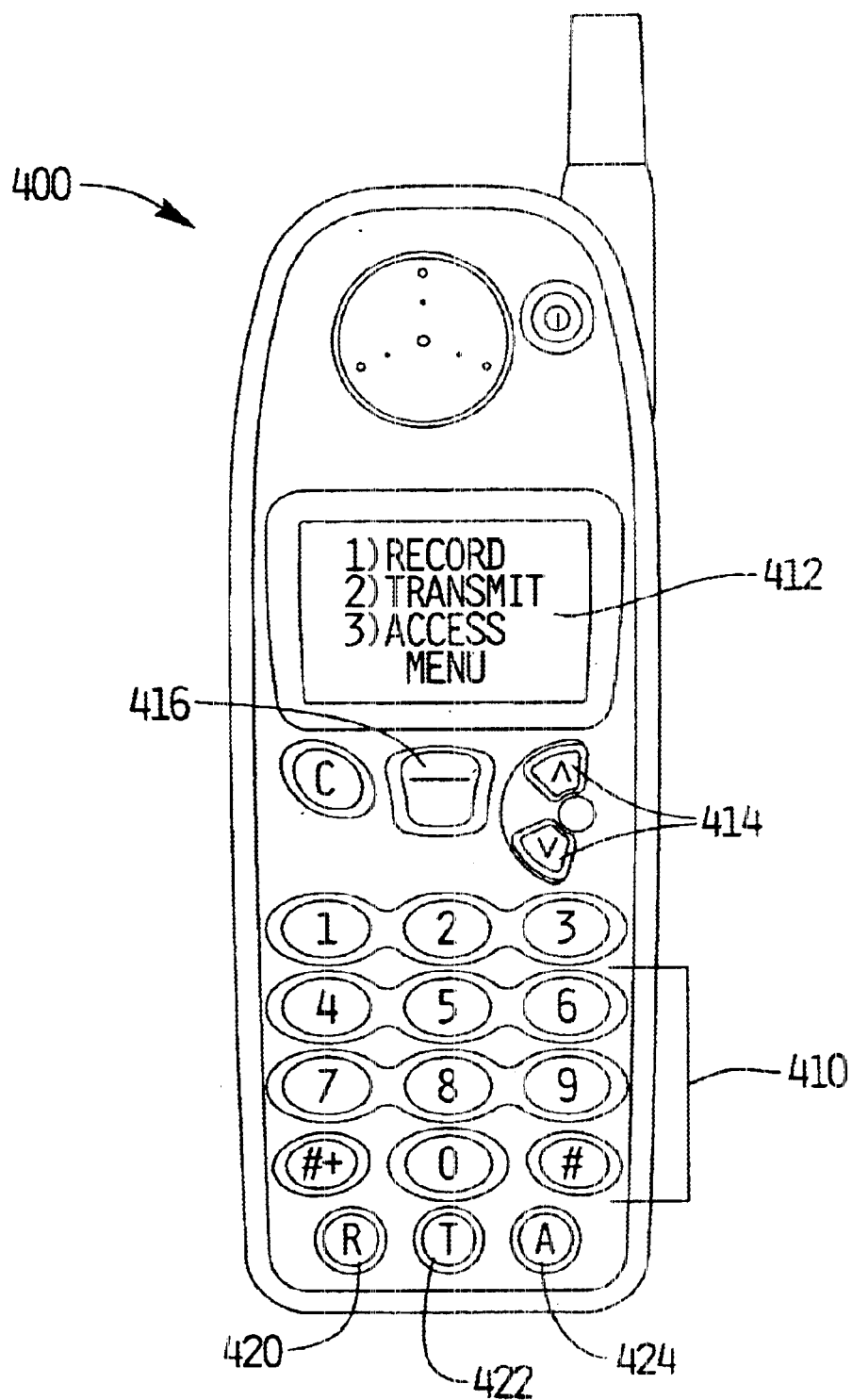
FIG_9

SYSTEM AND METHOD FOR RECORDING TELEPHONIC COMMUNICATIONS

CROSS-REFERENCE TO RELATED APPLICATIONS

This application is a continuation-in-part of copending U.S. application Ser. No. 09/619,515 filed Jul. 19, 2000.

BACKGROUND OF THE INVENTION

1. Field of the Invention

The subject invention relates to telephonic communications, and more particularly, to a system and method for recording, archiving and delivering the content of telephonic communications through a centralized archiving facility.

2. Background of the Related Art

The recordation of telephone conversations is well known in the art. Typically, telephone conversations are recorded using a device that is physically attached to a telephone, telephone line or Private Branch Exchange (PBX). Such equipment may consist of traditional analog or digital recording devices installed at the call originating or terminating facility. In large call centers, where a multiplicity of telephone conversations are simultaneously recorded, digital recorders are typically used. These recorders are often mechanically connected to individual telephone lines or to a telephone station on a full-time basis.

It is also known that law enforcement agencies monitor telephone lines by tapping into a monitored line through a central switching office. For example, U.S. Pat. No. 5,590,171 to Howe et al. discloses a method and apparatus for allowing a communication from a calling party to a called party to be monitored by a monitoring party, such as a law enforcement agency, and/or recorded without requiring the installation of any physical hardware or mechanical connections at the originating telephone. Instead, a bridge is created between the monitoring and monitored line. In this system, neither the calling party nor the called party are aware of the monitoring or of the recording of their communication. The system disclosed by Howe et al. is not configured to facilitate the delivery of the content of the communication to another party or location, nor does it enable a party to the communication to subsequently retrieve or access the content of their communication. In a special case, a call may be recorded to preserve the content as evidence in a legal proceeding.

Despite the deficiencies of the prior art, there are many reasons why a person would desire to have the content of their telephone calls archived or recorded for subsequent use or transmission. For example, the call may be archived as a memory aid in reviewing the content of a telephone call. Alternatively, the call may be archived as a means by which two parties can enter into a valid contract via telephone, and subsequently provide an electronic version of the oral contract to the contracting parties. The call may also be archived to facilitate a sharing of the content of the call with a colleague or other user, or as a means to authenticate the identity of the parties to a conversation, or as a memorandum.

The subject invention enables a party to a telephone call to selectively command the centralized archiving or recordation of the content of a telephone call without any dedicated physical recording device or hardware. The command can be made while the call is in progress, or a telephone call can be initiated in an archive mode. The central archive system is available on demand so that a large number of potential users can command access to a much smaller number of recording ports. In addition, the subject invention provides a mechanism for the near real-time delivery of a digital or analog file of the content of the archived call to the originator of the call or to a another party in a form consistent with electronic mail, file transfers, or other electronic communication techniques.

The capability to integrate a desk telephone set with a personal computer or other digital recording device has long been known. Typically, through direct electrical attachment or acoustic or magnetic coupling, the connection between a desk telephone and a personal computer analog input port or microphone port may be provided. Such technology causes the content on the analog channel to be digitized and stored to the disk of a personal computer or other storage medium including analog tape. The subject invention eliminates the need to have such arrangement at each desktop or originating/terminating user station, and instead makes such a facility available as a centralized resource on demand.

The opportunity to utilize telephonic archiving on an on-demand basis, adds substantial value to communication technologies. Moreover, the ability to send true copies of a telephonic communication in a standard computer readable format to others over an integrated network or the like is a significant advantage over the prior art.

It has also been recognized that users of wireless telephone devices are oftentimes unable to give full attention to telephone calls or take notes during a telephone conversation, as they are typically in a mobile environment. Thus, a system that would provide the capability to record and archive wireless telephone calls for subsequent delivery and/or access would be extremely beneficial.

SUMMARY OF THE INVENTION

The subject invention is directed to a unique system to facilitate the selective, on-demand recording, archiving and delivering of telephonic communications through a Centralized Archiving Facility (CAF). The system enables a user, who desires to archive the content of a telephone conversation, to do so through a service or utility function, rather than through the implementation of recording equipment at their individual telephone or location. The system allows access to the centralized archiving facility from any telephone attached to a telephone system which provides a three-way calling, add-on conference, no hold conference or other similar conferencing function.

In operation, a telephone user, about to be engaged in a two party conversation or who is already engaged in a two party conversation, may utilize the inherent add-on conference, three-way calling, no-hold conference, conference transfer or other similar feature provided as part of their telephone set, telephone system or service to link to the centralized archiving facility. As the call is received at the centralized archive facility, it is identified by any one of a variety of means including Caller ID or Automatic Number Identification. The centralized archive facility then causes the call to be archived in a digital or analog format.

The resulting audio or digitized audio file, is then stored and annotated with time and date, the identification of the party who originated the archive process and other information as may be available. Upon completion of the call, the centralized recording and archiving facility transmits the archived content (as a file) back to the originator in a digital or analog format. This transfer is accomplished using techniques known in the art such as, for example, by way of an e-mail attachment, or access to the archive may be provided through traditional Internet facilities such as a web browser or File Transfer Protocol (FTP).

Where the originating party is using a standard, central office subscriber telephone line, the central office feature of three-way calling may be used to access the centralized facility. Where the call originator is operating in a PBX or Centrex facility, the three-way calling, conference, No Hold Conference or similar three-way calling facilities may be used to add in the centralized archiving facility as a third party.

Where the call originator has access to a "No Hold Conference" facility, the centralized archiving utility may be invoked even while the user has a call in progress without any interruption in the call. This allows the archiving to take place even without the knowledge of the telephone correspondent. Where the user telephone is not equipped with a No Hold Conference facility, the user may initiate the archiving leg of a call, and then add-in the intended party, again allowing the content of the call to be transcribed without the knowledge of the corresponding party.

Where an originating user telephone is not equipped with an appropriate add-on conference, three-way calling, or other facility for originating a second leg of a call, the resulting archiving link may be obtained through the use of two telephone lines. In such a case, a second line is used to establish a call to the centralized archiving facility and the two call legs may be bridged to provide a through connection. Alternatively, the user may call the CAF and command that it add the intended party in a three-way conference call that includes that CAF.

Preferably, the CAF consists of a digital processor with stored instructions that cause any incoming analog or digital telephone call to be received, converted into an internal digital format, and stored to computer disk or other medium for archival storage. Typically, the system has a facility to handle a multiplicity of incoming telephonic channels simultaneously, and store the content of each channel separately to its own individual file or archive. Encryption may be created by means of additional stored computer instructions that use a variety of encryption techniques in which only an authorized person can convert the internal encrypted information into an intelligible playback of audio content by providing a secret password or key.

The system provides the originator or authorized user with a copy of the archive on an automated basis as soon as the communication is completed or via demand through a separate command and control function. Upon completion of the original telephone call, the centralized archive facility will cause the archive to be transmitted via Internet, local area network (LAN) or other transmission capabilities to the originator or designated station without any further interaction between the originator and the centralized archive facility. An e-mail attachment provides a convenient format for this transmission.

Incoming telephone channels may be provided as one or more analog telephone channels. They may also be provided as an aggregate high-speed telephone line where individual channels are multiplexed onto one or more digital channels, in which each of a multiplicity of channels is assigned to a time slot in an aggregated digital channel. As yet another alternative, the system may receive logical channels as a service of data packets when the means of connection is from "Voice Over Internet Protocol (VOIP)" connection. A combination of these modes may be used.

The system receives incoming telephone calls in either an analog or digital format through commercially available standard interfaces for analog telephony or digital telephony (including Internet Protocol Telephony). In the case of calls received in an analog format, the system relies on analog to digital converter telephony cards which may be implemented in a personal computer or other stored program control computer in which the originated incoming signal is digitized and stored to appropriate short-term and long-term computer memory, typically disk.

The centralized archive facility may further use in-band signaling, typically in a code format referred to as Dual Tone Multi-Frequency (DTMF), to allow a caller using the push buttons or touch-tone commands on their telephone set to send certain commands to the centralized facility. The centralized facility may use algorithms or other stored computer procedures to authenticate the user based upon the patterns of speech, energy, or "voice fingerprint."

The system relies upon traditional telephony, Internet Protocol telephony, and Time Division Multiplexing (TDM) as may be used by the originating telephone set, telephone networks or Private Branch Exchange to which either the originating or terminating subscriber is attached. The system uses traditional, off-the-shelf, analog to digital conversion technology (often referred to as a Digital Signaling Processor (DSP)) or other facilities for sampling the telephone signals at a rate suitable for creating a digital representation of the received audio information. The result is a digital file that may be stored on traditional computer disk, or other memory facilities. Where the voice signal is already in a digital sample format as pulse code modulated or Internet protocol encoded, the signal may be stored without such DSP cards.

In accordance with a preferred embodiment of the subject invention, the system comprises hardware and software for implementation with a PBX or Centrex system. Alternatively, the system is provided as a utility accessible through the Public Switched Telephone Network (PSTN) or IP/Internet network. Such network provided configurations are sometimes referred to as Application Service Provider (ASP) applications. In this case, no equipment need be installed at the customer premises except a personal computer or data terminal used to receive the archived file. The personal computer may be a standard, off-the-shelf PC equipped with Dialogic/Intel or other brand of Digital Signal Processor (analog to digital converter cards(s)) or analog to digital converter card(s)or data terminal with an appropriate instructional software program that is served with an e-mail facility.

It is envisioned that only a minimal number of ports in the CAF will serve a very large population as most individuals will only choose to archive a minimum number of their calls. Thus the need to install hardware devices for recording at a large number of stations is eliminated.

In sum, the subject invention provides a method for recording a telephone call upon demand by a party to the telephone call which includes the steps of receiving a request from a first party to record a telephone call between the first party and a second party, establishing a third-party connection with the first party and the second party, to receive the telephone call, and storing the content of the telephone call in memory.

The subject invention further provides a method for recording a telephone call upon demand which includes the steps of initiating a telephone call with at least one receiving party, and establishing a third-party connection with a central archive to facilitate recordation of the content of telephone call thereby.

The subject invention also provides a system for recording a telephone call at a central archive upon demand by a party to the telephone call which includes means for receiving a telephone call, means for storing the content of the telephone call, and means for delivering the content of the telephone call to a remote location.

The subject invention is further directed to a method for recording a telephone call, such as a wireless telephone call, upon demand which comprises the steps of initiating a telephone call from a telephone device, such as a wireless telephone device, with at least one receiving party, and establishing a third-party connection with a central archive to facilitate recordation of the content of the telephone call by the central archive by performing at least one of the following steps: depressing a dedicated function key on the telephone device; selecting an appropriate option from a menu displayed on the telephone device; entering a code on the telephone device represented by a sequence of keystrokes; or uttering a voice activation command either alone or in conjunction with a related menu option. It is also envisioned that the content of the telephone call would be transferred to at least one other location or accessed from the telephone device by performing either of these steps.

These and other unique features of the system and method of the subject invention will become more readily apparent from the following description of the drawings taken in conjunction with the detailed of the preferred embodiments.

BRIEF DESCRIPTION OF THE DRAWINGS

So that those having ordinary skill in the art to which the subject invention appertains will more readily understand how to configure and use the system and method of the subject invention, reference may be had to the drawings wherein:

FIG. 1 is a schematic representation of a system for recording and archiving telephonic communications configured in accordance with a preferred embodiment of the subject invention wherein the system resides at a neutral, secure location in which it is operated as an on demand service for hire;

FIG. 2 is a schematic representation of another system for recording and archiving telephonic communications configured in accordance with a preferred embodiment of the subject invention wherein the system resides at a customer's premises where a local PBX or Centrex telephone system is in use;

FIG. 3 is a schematic representation of yet another system for recording and archiving telephonic communications configured in accordance with a preferred embodiment of the subject invention wherein the system is depicted in a mode that supports telephone users who do not have access to three-way calling or user invoked conference calling capability;

FIG. 4 is a schematic representation of still another system for recording and archiving telephonic communications configured in accordance with a preferred embodiment of the subject invention wherein the service is supplied via a PBX or Centrex system and the originator identification is sent over a separate channel from the PBX to Central Archiving Facility;

FIG. 5 is a schematic representation of another system for recording and archiving telephonic communications configured in accordance with a preferred embodiment of the subject invention wherein, within a PBX or Centrex environment, incoming calls to the CAF may be identified using a multi-line proprietary telephone appliance;

FIG. 6 is a flow chart depicting an embodiment of the method of the subject invention wherein two or more parties are engaged in a telephone conversation and one of the parties initiates the archival process;

FIG. 7 is a flow chart depicting another embodiment of the method of the subject invention wherein the calling party invokes the archival process prior to initiating a telephone call;

FIG. 8 is a flow chart depicting yet another embodiment of the method of the subject invention wherein the call originator does not have access to three-way calling, conference or similar feature and therefore, invokes the archival process by first calling the archive facility and commanding the facility to add the intended party to the call; and FIG. 9 is an elevational view of a wireless telephone device configured in accordance with a preferred embodiment of the subject invention which includes a display screen for presenting menu options, a numeric keypad for entering numerical sequences, and a set of function keys for facilitating the recordation, transmission and access of telephonic communications.

These and other features of the system and method of the subject invention will become more readily apparent to those having ordinary skill in the art form the following detailed description of the preferred embodiments taken in conjunction with the drawings.

DETAILED DESCRIPTION OF THE PREFERRED EMBODIMENTS

Referring now to the drawings wherein like reference numerals identify similar aspects of the subject invention, there is illustrated in FIG. 1 a system 10 for recording or archiving telephonic communications configured in accordance with a preferred embodiment of the subject invention. In this system, a telephone user (A) having a telephone set 12, while in telephonic communication with a telephone user (B) having a telephone set 14, through a central office, PBX or long distance network 16, may cause a third party or line to be connected to the call through a Public Switched Telephone Network (PSTN) 18. This is preferably accomplished through a feature or button on telephone set 12, by way of a flash of the switch-hook on telephone set, or by similar means. The third party line is a line connecting a Centralized Archive Facility (CAF) 20. Archive facility 20 recognizes an alert signal and answers the incoming call from telephone set 12 by causing loop current to flow or by other means which may be used in a digital connection or Internet protocol line, as is well known in the art.

Preferably, the centralized archiving facility 20 comprises a digital processor (i.e., a personal computer) equipped with single or multi-line telephony terminations, and analog to digital converter cards that allow the incoming analog communication channels to be recorded or transcribed in real-time digital files. Alternatively, where the originator is using Voice Over Internet Protocol (VOIP), digital transmission, incoming communications may be received by the archiving facility 20 in a digital format, transcribed in that same format or may be translated to another storage medium or format.

As the centralized archive facility 20 answers the incoming call, it identifies the calling party (A) by any one of a variety of techniques known in the art that may include Caller ID, Automatic Number Identification (ANI), Dialed Number Indicating Service (DNIS), in band signaling (Dual Tone Multi-Frequency) or other available in band or out of band techniques. Optionally, the centralized archiving facility 20 may be equipped to further identify the originator through voice print technology in which the speaker's voice patterns are pre-stored in a database and associated with other identifying material such as telephone number, e-mail address, IP address, or the like. Where a PBX or Centrex facility is used in which a "Display" or "Inspect" key is an available feature, identification of the calling party may be done through the invocation of this feature as commanded via a Telephone Application Programming Interface (TAPI) as is known in the art (see, for example, FIG. 5).

The centralized archive facility 20 then captures the content of the call in a format that allows temporary storage of the content in a digital or analog mode. Preferably, the archive facility is equipped to provide this function on a multiplicity of lines simultaneously. Alternatively, the facility may receive calls in a composite format in which representations of multiple logical conversations occur in a single physical channel such as E-1, T-1, T-3, Primary Rate Interface (PRI), ATM, voice-over IP mode, or optical carrier.

The central archive facility 20 uses a variety of techniques to determine the identification of the call originator (A) including caller ID, automatic number identification, speech recognition, digits entered through touch-tone or other in-band signaling. Based upon the identification of the caller or other party to the conversation and information maintained in a relational database, the archive facility 20 may prompt the user for additional instructions or commands through voice recognition, in band or out of band signaling.

Additionally, information may be sent to the central archive facility by the caller through out of band signaling using an alternative communications mechanism for the transmission of command instructions. Usually such instructions would indicate the retention period for the archive, the means to be used in delivering a copy of the content of the call, authentication of the originator, or an indication to cause a warning tone to be played at discreet intervals throughout the communication, where state law may require such indication.

During a telephone call, the central archiving facility 20 continuously or periodically monitors the communication channel to determine the end of the call. This is accomplished by any one of a multiplicity of technologies, including, but not limited to interruption of loop current, an audible tone received in band, a variety of out of band signals, such as a command and control signal sent as part of a PRI channel, or as a "D" or signaling channel. The archive facility 20 may also detect the end of a call by observing a long period of silence over the line. When the facility 20 determines the call has ended, it stores a representation of the audio content of the call, together with a time and date stamp and any other identifying information relative to the call, to a storage medium 22, such as a magnetic storage device or the like.

The content of the telephone call is stored or archived in an analog or digital format such as Pulse Code Modulation (PCM), Adaptive Pulse Code Modulation (APCM), or as a standard wave (WAV) or MP-3 format for compression. The system may utilize standards for voice or data compression which allow the stored archive to use less resources in the form of disk or memory space, yet be reconstructed using algorithms or stored computer instructions so that it is again intelligible and presented in an uncompressed format.

Upon completion, based upon the identification of the call originator or commands sent by the originator, the content of the call is sent from the central archive facility to the originator or other party as a digital file or the like. This is accomplished by using e-mail or file transfer protocol over an integrated network 24, such as the Internet or World Wide Web, or a real-time or multimedia file that may be "played" from the CAF using streaming multimedia technology as is known in the art, or similar technology. It is also envisioned that the content of the telephone call (the file) may be transmitted over a data communication network to one or more parties in real-time using audio steaming techniques known in the art.

Alternatively, the content of the call or file may be physically sent as an analog or digital tape, disk, CD-ROM or DVD. This file may then be delivered to a personal computer 26 or other device at the originator's location. It is also envisioned that the content of the communication can be delivered in paper form when transcribed using voice recognition, speech to text or human intervention to create a text transcription. A paper form may be delivered to a party or location by fax.

To protect against possible transmission loss of the e-mail, the file is maintained on the CAF for a parameterized period of time and then automatically deleted. It is envisioned that the central archive would warn a user that an archived call will be deleted after a parameterized or fixed period of time, unless the user intervenes to prevent such action. The time period for deletion of archived files may be managed through a relational database by way of communications between the user and the central archiving facility.

It is envisioned that the content of the call may be encrypted by the central archiving facility such that it may be played only by the intended party with the correct password, key or other means of identification. This will prevent unauthorized parties from understanding, accessing or interpreting the content of the call, even if they do obtain a copy of the actual file. Software on the personal computer 26 of the file recipient may then be used to play the content and optionally restore it to an unencrypted format so that it may be copied or sent to another individual or location as may be required. Encryption can be accomplished by any one of a variety of techniques known in the art during or after the recording of a telephone conversation. These include compression to an MP-3 or MP-4 file format to substantially reduce the size of the resultant file. In such instances, the digital sampling of the analog speech signal may occur at a variety of sampling rates.

If the telephone system or PBX serving the originator (A) has a "No Hold Conference" feature, the archive facility 20 may be accessed without the knowledge of the recipient (B). If the originator (A) is already in communication with the recipient (B) and does not have No Hold Conference available, the originator (A) may ask the recipient (B) to hold the line and then use the switch-hook on the telephone 12 or conference feature to establish the connection with the archive facility. If the originator (A) determines, in advance of the call, that archiving of the call content is desirable, they may originate the call to the central archiving facility 20 first, and then use their conference or three way calling feature on telephone 12 to add the call recipient (B) as the third party to the call.

The laws of certain jurisdiction may require the recordation or transcription of a telephone conversation to be done only with the permission of all parties to that conversation. Furthermore, such laws may stipulate that a warning tone (beep tone) be played periodically, i.e., at least once every 15 seconds in the course of the conversation. Where such restrictions apply, the centralized archiving facility has the capability of automatically generating an appropriate beep or warning tone which is played to all recipients/parties at the time of archiving. The central archiving facility is equipped either through hardware or software (stored procedures) to cause the warning tone or other message to be played at intervals, as appropriate. As required, the central archiving facility may be equipped with appropriate hardware and software to apply a time stamp to the call consistent with an accurate national time source. As such, the system would allow a "Certified Telephone Call."

With continuing reference to FIG. 1, the system of the subject invention may reside at a neutral, secure location in which it is operated as an on-demand service for hire. When provisioned as a service or utility, the CAF may be pre-subscribed, and the user would identify themselves, establish credit and pre-register an address for delivery of the archive. As an alternative, the CAF may be arranged to archive calls from non-subscribed users who must establish billing arrangements after the call is made via credit card or other means. They must also provide a delivery address after the fact. Alternatively, the service may be billed by a common carrier and billed together with other services.

In yet another mode, subscription and payment may be made via a 900 number. Where the central archive facility is employed as a service or utility, the system includes stored instructions with data tables that provide for automated billing for usage based upon such variables as the number of calls archived, the duration of a call, the number of days a call is archived, digitization rate, delivery options, class of service or the time of day the service is utilized. In addition, a reporting function is included that provided reports to customers on various aspects of the services provided include usage and file storage.

Another aspect of the subject invention is that the system enables a user or customer to manage their archived telephone calls through various commands sent in band as touch tone signals or by voice commands. Alternatively, the user may manage their archived files and interact with the central archiving facility through an Internet or World Wide Web browser or a similar data communications system. These features will allow a user to access and replay archived telephone conversations using conventional commands such as rewind, fast forward, pause or the like. They will also allow changes in delivery instructions or additional annotations of the call content.

Referring to FIG. 2, in another preferred embodiment of the subject invention, the archiving system resides on-site at a customer's premises, such as in a law firm, commercial business establishments or similar workplace, where a local PBX or Centrex system is in use. In this instance, the PBX 16 is in direct communication with the central archiving facility 20 rather than being linked through a public switched telephone network.

As illustrated in FIG. 3, the system of the subject invention is depicted in a mode that supports telephone users who do not have access to either three-way calling or user invoked conference calling capabilities. Thus, a caller (A) who desires to place an archived telephone call from telephone 12 first calls the central archive facility 20 over a public switched telephone network 18 and identifies themselves. Then, by providing additional commands sent via voice recognition, speech recognition, in-band signaling or other techniques, caller (A) causes the central facility 20 to call another party (B) and conference the call using a simple conference capability of the facility or the conference capability of the telephone lines serving the facility. This mode is particularly compatible with wireless, and public cellular phones that may not have a three-way calling capability.

A variety of alternative techniques may by used to acquire the identification of the party initiating the call archiving system. These include subscriber Caller ID in which Caller ID is sent by the telephone network between the first and second ring cycles of the telephone call. Other techniques include Automatic Number Identification sent via a variety of facilities, in-band signaling sent as an ID code by the user in touch tone and voice recognition as well as many other out of band arrangements. So called "Third Party Call Control" or "Open Application Interface" may alternatively be used to provide user identification.

Referring now to FIG. 4, there is illustrated a system wherein service is supplied via a PBX or Centrex system. In this instance, the originator identification may be sent over a separate channel (F) from the PBX 16 to the central archiving facility 20. Depending on the PBX manufacturer, this channel for delivery of calling party identification may be referred to as "Call Detail Recording", "Third Party Call Control", "Open Applications Interface", "Computer Telephony Integration (CTI)", or the like.

As an alternative, referring to FIG. 5, where the central archiving facility 20 is in a PBX or Centrex environment, incoming calls to the archive facility may be identified using a multi-line proprietary telephone set 28. Each of the multiple lines to the central facility 20 appears on a "bridged" digital telephone set 28 in which each of the lines termination point in the central facility appears on its own dedicated button on the digital telephone set. By equipping this multi-line telephone set 28 with a first party call control mechanism, the central archive facility 20 can interrogate the phone to receive the identity of the calling party. In many cases, this link shown as "G" may be called a Telephone Application Programming Interface (TAPI).

In one embodiment of the subject invention, the method of recording telephone conversations between two or more parties is employed in conjunction with an Advanced Intelligent Network (AIN). In this instance, the central archiving facility is configured to monitor and record telephone conversations. Accordingly, one or more telephone lines are monitored to detect the initiation or receipt of a telephone call. The content of the telephone call is then recorded by the central archive facility upon initiation or receipt of the call. Thereafter, the content of the telephone call is delivered over an electronic communication network, such as the Internet, for subsequent review. It is envisioned that the central archive could be configured to monitor a multiplicity of telephone lines to detect communications between particular individuals based upon information stored in a database, including, for example, voice recognition patterns.

This embodiment of the invention is particularly well adapted for use by law enforcement agencies. For example, a telephone conversation may be monitored and recorded or archived by a law enforcement agency for subsequent use as evidence of a criminal act in a legal proceeding. The content of the telephone call may be encrypted during or after recordation to preserve the integrity of the evidence, and the encrypted file may then be delivered to a third party over an electronic communication network to preserve the chain of custody. It is envisioned that the file would remain encrypted until such time as the custodian of the file obtained a court order permitting access to the file.

The subject invention also provides a system and method for certifying the integrity of a recorded or archived telephone call between two or more parties. Moreover, the central archive facility constitutes an independent third party that acts as a trustee to maintain the integrity of the content of a recorded telephone call. The central archive facility is adapted to certify that the content of a telephone conversation is authentic and that is has not been altered or modified in any way. It is envisioned that a certificate of authenticity or a similar mode of certification would be delivered or transmitted to a recipient of a certified telephone call. This feature is particularly useful where oral contracts are negotiated during a telephone conversation, and a true and accurate recording of the terms of the agreement is required by the parties thereto.

In use, a caller can instruct the central archive to certify a particular telephone conversation, either before initiating the telephone call or after the telephone call has been recorded. Where the system is provided as a service for hire, a premium fee may be charged for a certified call. It is also envisioned that the act of certifying a telephone call can be automatically invoked when a telephone call is received by the central archive. Thus, each and every call received by the central archive would be certified.

Referring now to FIG. 6, there is illustrated a flow chart depicting a method of the subject invention wherein two or more parties are engaged in a telephone conversation over a communication network and one party (the user) invokes the archive/recording process. At step 110, a telephone call is in progress between two or more parties. At a particular time during the conversation, one of the parties determines, at step 112, that the telephone conversation should be archived. Thereupon, at step 114, a party, be it the call originator or another party to the conversation, invokes or engages the archival process to facilitate recordation of the conversation in progress. Invocation of the archival process can be achieved, for example, by depressing a particular control key on the user's telephone set or by similar means such as voice activation commands.

At step 116, the archive communication line is signaled and the identification of the caller is received in order to provide positive identification of the user for purposes of limiting access to the archive and for billing purposes where the archival system is provided as a fee based service. Alternatively, the archive facility may receive information regarding the identification of the telephone invoking the feature. Then, at step 118, based upon the identification of the caller, the archive facility conducts a database inquiry to obtain information relating to the caller, including, for example, delivery options such as an e-mail address.

At step 120, the archive facility determines whether archiving of the telephone conversation is permitted. If the response is positive, recordation of the conversation commences at step 122, and the archive facility commences a monitoring loop at step 124 to determine when the telephone call has been terminated. If the response to the inquiry at step 120 is negative, i.e., if archiving is not allowed, recordation does not occur and the communication link with the archiving facility can be terminated.

At step 124, when the archive facility detects the end of the telephone conversation, a determination is made at step 126, based upon the identification information obtained during the database query at step 118, as to whether the content of the telephone conversation is to be encrypted to prevent unauthorized access thereto. If encryption is not required, at step 128 the system delivers the content of the telephone conversation based upon the delivery instructions obtained in the database query at step 118 and/or stores the content of the conversation in memory as an archived file. If encryption is required, then the content of the file is encrypted at step 130, and the system proceeds to step 128 to deliver the file and/or store the encrypted content of the file.

Referring to FIG. 7, there is illustrated a flow chart depicting a method of the subject invention where the calling party invokes the archival process before initiating a telephone conversation over a communication network. In particular, at step 210, the user or originator of the phone call initiates a call to the central archiving facility. Thereafter, at step 212, the archive line is seized and the caller identification information is received. A database query is conducted at step 214 to obtain information relating to the caller such as delivery instructions, delivery address, and the like. Then, based upon the identification of the caller, a determination is made at step 216 as to whether the call can be archived.

If archiving is permitted, the system proceeds to step 218 whereupon the call initiated at step 210 is answered by the archiving facility and recordation commences. Then at step 220, the call originator, using the conference feature of the originating telephone set, dials the intended recipient of the call to conduct a conversation. At such a time, the telephone conversation is recorded by the central archive facility, with or without the knowledge of the recipient. If state law requires, a tone may be generated periodically during the telephone conversation to indicate that the conversation is being recorded.

Once the telephone conversation begins, the system proceeds into a monitoring loop at step 222 to detect the end of the call. When the call ends, the system proceeds to step 224 to determine whether the content of the telephone conversation should be encrypted based upon information obtained during the database query at step 214. If the call is to be encrypted, the content is encrypted at step 226. Thereafter, at step 228 the encrypted file is delivered based upon the delivery information obtained at step 214 or stored in archival memory. If the call does not require encryption, the system proceeds from step 224 directly to step 228 to deliver or store the content of the telephone call.

Referring to FIG. 8, there is illustrated a flow chart depicting a method of the subject invention wherein a user invokes the archival process from a telephone set without conference or three-way calling capability. In this case, at step 310, the user initiates a telephone call over a communication network to the central archive facility. Thereupon, at step 312 the archive line is seized and caller identification information is received by the archive facility. A database query is then conducted at step 314 to obtain information relating to the caller such as delivery instructions and the like.

Following the database query, the system proceeds to step 316 to determine whether the caller identification is in the database. If the caller is not in the database, the communication may be terminated. If the caller identification is in the database, the system proceeds to step 318 whereupon the user is prompted to enter the telephone number of the intended recipient of the telephone call. Then, at step 320, a second telephone line is seized or a conference feature is invoked by the archive facility, and the telephone number of the intended recipient is dialed by the archive facility.

Thereafter, at step 322, the incoming and outgoing telephone calls are conferenced to establish a multi-party call. Then, at step 324 the system seeks to determine whether the first or initiating party has released themselves from the call. If the system determine that the first party has released from the call, the communication link with the archive may be terminated. If the originator remains on the line and the system determines at step 326 that the intended recipient of the phone call answers the call, the system proceeds to step 328 whereupon recordation of the call commences.

Thereafter, the system proceeds into a monitoring loop at step 330 to detect the end of the call. At the end of the call, at step 322, the system determines whether the content of the telephone call is to be encrypted based upon the database query conducted a step 316. If encryption is required, the file is encrypted at step 334, and at step 336 the content of the encrypted call is delivered and/or saved. If, at step 332, it is determined that encryption is not required, the system proceeds directly from step 332 to step 336 whereupon the unencrypted file is delivered based upon the delivery instructions obtained at step 314, or it is stored in the archive for subsequent retrieval or delivery.

The subject invention is also directed to a method for recording a telephone call upon demand utilizing a telephone device such as the wireless telephone device 400 illustrated in FIG. 9. Wireless telephone device 400 includes, among other things, a keypad 410 with a set of number keys, a liquid crystal display screen 412 for displaying information, and several special function keys, among which are function keys 420, 422 and 424 which are particularly associated with the method of subject invention.

More particularly, the method of the subject invention involves initiating a telephone call with at least one other party using a telephone device, such as wireless device 400, and establishing a third-party connection with a central archive facility to facilitate recordation of the content of the telephone call. In the case of a wireless telephone call, the third-party connection may be established over a wireless network, such as, for example, over a mobile switching exchange or a cellular network. In a wireless environment, the content of a telephone call may be recorded/archived in a digital or analog format.

In accordance with the subject invention, the third-party connection with the central archive can be established in a number of ways. For example, a third-party connection can be established by entering a code on the keypad 410 of telephone device 400 represented by a sequence of keystrokes, such as by dialing "*22" or a similar expression. Alternatively, a third-party connection can be established with the central archive by depressing a special function key 420. Key 420 may have indicia imprinted thereon, such as an "R" or the word "Record." Another way to establish a third-party connection with the central archive facility is by selecting an appropriate menu option (i.e., "Record") presented on the display screen 412 of telephone device 400. The user would scroll through the menu options in a conventional manner using scroll keys 414 or the like, and select the appropriate menu option by striking the execute key 416. It is also envisioned that the user of wireless telephone 400 may establish the third-party connection with the central archive by uttering an appropriate voice command, such as "Record." In each instance, when the third-party connection is established and the recording feature of the system is invoked, a signal is received by the wireless network which causes the content of the call to be digitized and/or packetized, and then archived on a digital storage media for subsequent delivery and/or access by the user.

In accordance with the subject invention, after the content of the telephone call has been recorded by the central archive facility, the user of wireless device 400 can transfer the content of the telephone call to at least one other location. This may be accomplished in a number of different ways. For example, the content of the call may be transferred based upon delivery instructions stored in a database associated with the central archive. Alternatively, the content of the telephone call can be transferred by depressing a dedicated "Transfer" function key 422, by entering a code using the keypad 410, or by selecting an appropriate menu option presented on display screen 412. It is also envisioned that the content of the call can be transferred to at least one other location by the utterance of an appropriate voice command such as "Transfer" that would be recognized by the central archive facility. Voice commands may also be used to select displayed menu options.

In accordance with the subject invention, the user of wireless telephone 400 may also access the recorded content of the telephone call from the wireless device. This may also be accomplished in a number of different ways. For example, the content of the call may be accessed by depressing a dedicated "Access" function key 424, by entering a code using the keypad 410, or by selecting an appropriate menu option presented on display screen 412. This would be similar to a playback feature on a conventional recording device, and would be particularly useful when the content of the telephone call contains notable information such as driving instructions or the like. Alternatively, the user of wireless telephone 400 may access the recorded content of the telephone call from the wireless device by the uttering an appropriate voice command recognized by the central archive facility.

Those skilled in the art should readily appreciate that the use of dedicated function keys, menu options and code entry to facilitate the recording, transferring and accessing of the content of a telephone call is not limited to wireless telephone devices. Moreover, it is envisioned that each of these features may be employed on a conventional hard-wired telephone set.

Although the disclosed system and method have been described with respect to preferred embodiments, it is apparent that modifications and changes can be made thereto without departing from the spirit and scope of the invention as defined by the appended claims.

What is claimed is:

1. A method for recording a telephone call in a central archiving facility upon demand by a calling party, comprising the steps of:
   a) seizing a telephone call from a calling party;
   b) receiving information regarding the identity of the calling party;
   c) determining whether recordation of the telephone call by the central archiving facility is permitted based upon the identity of the calling party;
   d) answering the call at the central archiving facility provided that recordation of the telephone call is permitted;
   e) commencing recordation of the telephone call when the calling party, using a conference feature of the originating telephone set, dials an intended recipient of the telephone call to conduct a conversation; and
   f) monitoring the telephone call to detect the end of the call.

2. A method for recording a telephone call in a central archiving facility according to claim 1, further comprising the step of determining whether the content of the telephone call should be encrypted.

3. A method for recording a telephone call in a central archiving facility according to claim 2, further comprising the step of encrypting the content of the telephone call.

4. A method for recording a telephone call in a central archiving facility according to claim 3, further comprising the step of delivering the encrypted content of the telephone call based upon delivery instructions stored in a database.

5. A method for recording a telephone call in a central archiving facility according to claim 3, further comprising the step of storing the encrypted content of the telephone call at the central archiving facility.

6. A method for recording a telephone call in a central archiving facility according to claim 1, further comprising the step of delivering the content of the telephone call based upon delivery instructions stored in a database.

7. A method for recording a telephone call in a central archiving facility according to claim 1, further comprising the step of storing the content of the telephone call at the central archiving facility.

8. A method for recording a telephone call in a central archiving facility according to claim 1, further comprising the step of generating a tone during the telephone conversation to indicate that the conversation is being recorded.

9. A method for recording a telephone call in a central archiving facility according to claim 1, further comprising the step of certifying that the content of the telephone conversation is authentic and has not been altered.

10. A method for recording a telephone call in a central archiving facility according to claim 1, further comprising the step of terminating the telephone call if recordation of the telephone call is not permitted.

11. A method for recording a telephone call in a central archiving facility upon demand by a calling party, comprising the steps of:
 a) seizing a telephone call from a calling party;
 b) receiving information regarding the identity of the calling party;
 c) conducting a database query based upon the identity of the calling party to obtain information including delivery instructions and a delivery address;
 d) determining whether recordation of the telephone call by the central archiving facility is permitted based upon the identity of the calling party;
 e) answering the call at the central archiving facility provided that recordation of the telephone call is permitted;
 f) commencing recordation of the telephone call when the calling party dials the intended recipient of the telephone call to conduct a conversation;
 g) monitoring the telephone call to detect the end of the call; and
 h) delivering the content of the telephone call to a delivery address based upon the delivery instructions obtained during the database query upon detecting that the telephone call has ended.

12. A method for recording a telephone call in a central archiving facility according to claim 11, further comprising the step of determining whether the content of the telephone call should be encrypted based upon information obtained during the database query.

13. A method for recording a telephone call in a central archiving facility according to claim 11, further comprising the step of encrypting the content of the telephone call.

14. A method for recording a telephone call in a central archiving facility according to claim 11, further comprising the step of storing the content of the telephone call at the central archiving facility.

15. A method for recording a telephone call in a central archiving facility according to claim 11, further comprising the step of terminating the telephone call if recordation of the telephone call is not permitted.

16. A method for recording a telephone call in a central archiving facility upon demand by a calling party, comprising the steps of:
 a) seizing a telephone call from a calling party;
 b) receiving information regarding the identity of the calling party;
 c) determining whether recordation of the telephone call by the central archiving facility is permitted based upon the identity of the calling party;
 e) answering the call at the central archiving facility provided that recordation of the telephone call is permitted;
 f) commencing recordation of the telephone call when the calling party dials the intended recipient of the telephone call to conduct a conversation;
 g) monitoring the telephone call to detect the end of the call;
 h) determining whether the content of the telephone call should be encrypted based upon information obtained during a database query; and
 i) delivering the content of the telephone call to a delivery address based upon delivery instructions obtained during the database query.

17. A method for recording a telephone call in a central archiving facility according to claim 16, further comprising the step of encrypting the content of the telephone cal provided that encryption is required.

18. A method for recording a telephone call in a central archiving facility according to claim 16, further comprising the step of storing the content of the telephone call at the central archiving facility.

19. A method for recording a telephone call in a central archiving facility according to claim 16, further comprising the step of terminating the telephone call if recordation of the telephone call is not permitted.

* * * * *

UNITED STATES PATENT AND TRADEMARK OFFICE
CERTIFICATE OF CORRECTION

PATENT NO.   : 6,661,879 B1
DATED        : December 9, 2003
INVENTOR(S)  : Schwartz et al.

It is certified that error appears in the above-identified patent and that said Letters Patent is hereby corrected as shown below:

Column 14,
Line 44, insert -- , wherein the calling party is identified by a technique selected from the group consisting of speech recognition, caller ID, automatic number identification, dialed number indicating service, in band signaling and out of band signaling -- inserted following "party";

Column 15,
Line 30, insert -- , wherein the calling party is identified by a technique selected from the group consisting of speech recongnition, caller ID, automatic number identification, dialed number indicating service, in band signaling and out of band signaling -- inserted following "party";

Column 16,
Line 21, insert -- , wherein the calling party is identified by a technique selected from the group consisting of speech recognition, caller ID, automatic number identification, dialed number indicating service, in band signaling and out of band signaling -- inserted following "party";

Signed and Sealed this

Twenty-seventh Day of April, 2004

JON W. DUDAS
*Acting Director of the United States Patent and Trademark Office*